H. G. VOIGHT.
SPARE TIRE CARRIER.
APPLICATION FILED MAR. 9, 1920.
1,358,801.
Patented Nov. 16, 1920.
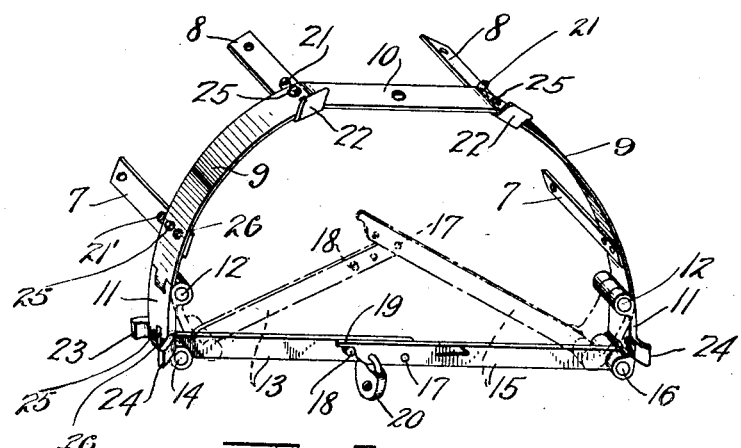
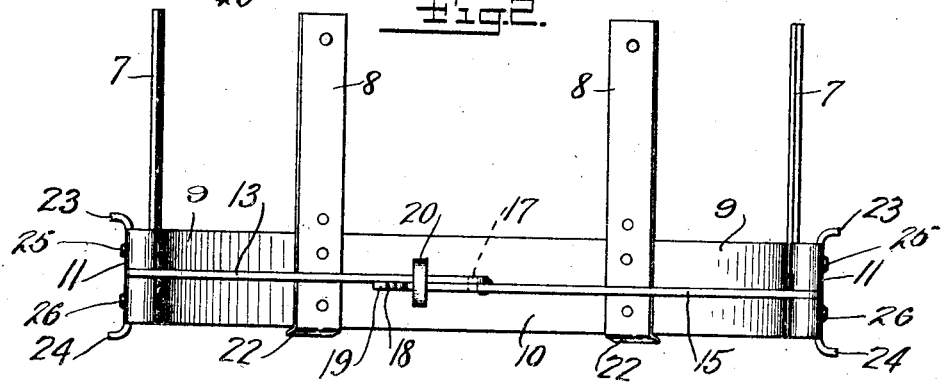
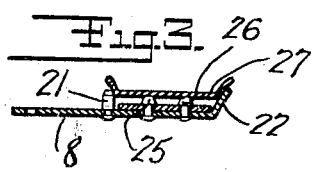 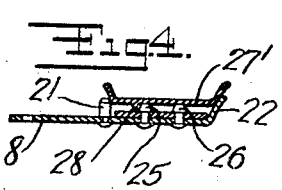
Inventor
H. G. Voight
By his Attorneys

UNITED STATES PATENT OFFICE.

HENRY G. VOIGHT, OF NEW HAVEN, CONNECTICUT.

SPARE-TIRE CARRIER.

1,358,801.   Specification of Letters Patent.   Patented Nov. 16, 1920.

Application filed March 9, 1920. Serial No. 364,442.

*To all whom it may concern:*

Be it known that I, HENRY G. VOIGHT, a citizen of the United States of America, residing at New Haven, Connecticut, have invented a new and useful Spare-Tire Carrier, of which the following is a specification.

My invention relates to a carrying device for carrying an automobile tire rim upon which a spare tire may be mounted.

The main object is to provide a simple form of construction which is adapted to be applied to any type of car and which is adapted to carry any of the ordinary types of tires and rims.

Another object is to provide a construction which can be readily operated and which will not stick and become difficult to release.

Another object is to facilitate the easy and quick application and removal of the tire rim whether the rim has projecting lugs or not.

In the accompanying drawings I have shown my invention in its preferred form in which—

Figure 1 is a perspective view of the device embodying the improvements of my invention showing it in full lines in the position which the parts would occupy when a tire is in place and locked, and showing in dotted lines the position of the parts when the tire is released.

Fig. 2 is a bottom plan view of the same on a somewhat larger scale.

Figs. 3, 4 and 5 are detailed sectional views showing different styles of tire rims in place.

In my present invention, the carrying device is such that one carrier for one size of rim will successfully receive and carry various styles of wheel rims of one size.

In the drawings, 7—7 and 8—8 are brackets by which the carrier may be secured to a car in any suitable manner. These brackets are connected to the rigid portion of the carrier which comprises two appropriately curved flat side portions 9—9 connected by a straight upper portion 10. The curved side portions are preferably formed on the arc of a circle slightly less in diameter than the inner diameter of the plain flat interior portion of the tire rim which it is intended to mount thereon. At the lower end of each side member 9 is a swinging rim gripping section 11, the same being hinged at 12 so that its free end may be adapted to move in and out, or radially, with relation to the center of the carrier. 13 is a toggle lever hinged at 14 to the rim gripping member 11. 15 is another toggle lever hinged at 16 to the opposite rim gripping member. These toggle levers are pivotally connected together at 17, and one of the levers may be provided with a stop pin 18, and the other with a co-acting stop shoulder 19 to hold the levers in a substantially straight line when pressed down. A padlock or other suitable lock 20 may be employed for positively locking the toggle levers in the rim holding position shown in full lines in Fig. 1. Preferably the pivotal center of the hinge 17 is below the pivotal center line of the hinges 14 and 16 when the rim gripping sections 11—11 are spread apart and the stops 18—19 are in engagement. By reason of this arrangement of stops and centers, the levers will tend to remain in the straightened out position even though unlocked. The hinged gripping sections 11—11 are each provided near their free ends with what I will term a rim gripping jaw formed by two outflaring flanges 23—24 which engage the front and rear edges of the tire rim when the same is in place. The rigid part of the carrier is provided with rim supporting and rim gripping means of unique construction. This rigid portion of the carrier is provided with spacer means comprising preferably a plurality of spacer studs 25—26 which engage the plain flat inner surface of the tire rim so as to hold the same slightly away from the flat surface of the portions 9—9. Some styles of tire rims on the market are perfectly smooth or flat on their interior surface, such as the rim 27 shown in Fig. 3. Other styles of rims such as 27', shown in Fig. 4, have an inwardly projecting annular bead or rib 28; while other tire rims 27", shown in Fig. 5, have two internal annular spaced beads or ribs 28' and 29. These beads actually reduce the internal diameter of such rims as compared with rims having a plain flat interior surface. The height of the spacer studs 25—26 should preferably be at least equal to the height of these annular beads or ribs, and these studs 25—26 should be so located as to stand to one side of said beads on the rims and preferably toward the center line of the rim as best seen in Figs. 4 and 5.

The rigid part of the carrier is also provided with one or more tire rim gripping jaws arranged to engage the tire rim at its opposite edges, and these gripping jaws are constructed in a unique manner, preferably as follows: The outer portion of each of these jaws may be formed by bending up the outer end of one or both of the supporting brackets 8—8 to provide a flaring gripping flange 22 for the outer edge of the tire rim when the latter is in place. The shoulder for the inner edge of the tire rim is formed by a stud 21 of greater height than the spacer studs above referred to. The stud or studs 21 are preferably carried by that bracket arm which is bent at its end to provide the flange 22. In the drawing, two flanges 22—22 and two studs 21—21 are shown—each companion pair forming a rim holding jaw. Additional studs 21' to help position the rim may be used if desired.

The distance circumferentially from the lower end of one rim gripping section 11 up over the frame to the lower end of the other gripping section 11 is somewhat greater than 180°; while the distance from one hinge 12 up and around the frame to the other hinge 12 is preferably somewhat less than 180° thus when the rim gripping sections are retracted clearance is afforded so that the tire carrying rim may be lifted into place on the tire carrier and dropped down between the upper holding jaws formed by the parts 21—22. The toggle may then be straightened out so that the gripping jaws on the hinged sections 11—11 will be forced into intimate contact with the tire rim to positively hold the same in place. Spacer studs 25—26 are preferably provided on the ends of section 9.

I claim:

1. A tire rim carrier comprising, a rigid support, a plurality of spacer studs carried by the body of said support and arranged to engage the flat inner surface of a tire rim to hold said surface in a spaced relation to the body of said rigid support, a hinged rim gripping section at the lower end of said rigid support, a means for operating said hinged rim gripping section, a clamping jaw on said hinged rim gripping section for embracing a tire rim at its opposite edges, and two or more jaws at other points on said carrier for gripping a tire rim at opposite edges all of said jaws coöperating to hold the rim in place on the carrier, said spacer studs operating to make the carrier adaptable to tire rims of different styles.

2. In a tire rim carrier, a rigid support, two hinged rim gripping sections at the lower opposite ends of said rigid support, a pair of toggle levers connecting said hinged sections to move the same in and out, a pair of jaws on the rigid support for engaging a rim at its opposite edges, and a pair of jaws at or near the free end of each of said hinged sections for gripping a tire rim at its opposite edges, the several jaws being spaced apart at proper distances to hold a tire rim against removal from the carrier, means carried by the body of the rigid support for holding the flat interior surface of a tire rim spaced away from the body of said rigid support to afford clearance for projections on the interior surface of said rim, whereby the carrier is adapted to carry tire rims of different styles.

3. In a tire rim carrier, a rigid support, two hinged rim gripping sections at the lower opposite ends of said rigid support, a pair of toggle levers connecting said hinged sections to move the same in and out, a jaw on the rigid support for engaging a rim at its opposite edges, and a jaw adjacent the free end of each of said hinged sections for gripping a tire rim at its opposite edges, the several jaws being spaced apart at proper distances to hold a tire rim against removal from the carrier, spacer means on said carrier for holding the flat interior surface of a tire rim spaced away from the flat surface of rigid support to afford clearance for projections on the interior surface of said rim, whereby the carrier is adapted to carry tire rims of different styles, the upper part of the rigid support being flattened down to afford additional clearance between the carrier and the adjacent part of the rim.

4. In a tire rim carrier, a rigid support having two opposite sides of circular contour and of less external diameter than the internal diameter of the rim adapted to be supported thereby, spacer means carried by said carrier for engaging the flat inner surface of a tire rim to hold that part of said rim in spaced relation thereto, a plurality of jaws on said carrier arranged to engage the opposite edges of a tire rim said jaws being located at proper spaced relation to prevent removal of the rim from the carrier, at least one of said jaws being movable toward and from the center of the carrier to release the rim, and means for moving said jaw into and out of the rim holding position, said spacer means operating to make the carrier adaptable to tire rims of different styles.

5. In a tire carrier, a rigid supporting frame including two sides of circular contour, the external diameter of the same being somewhat less than the internal diameter of the rim to be supported thereby, spacer means carried by the rigid portion of the carrier for engaging the flat inner surface of a tire rim to hold that part of said rim in spaced relation to the outer surface of the carrier, whereby the carrier is adapted to receive and carry tire rims of different styles, a plurality of jaws on the carrier arranged to engage a rim on its opposite edges, said jaws being located at properly spaced intervals to prevent removal of the rim from the carrier, two of said jaws being movable toward and from the center of the carrier, and a toggle lever connected therewith for operating the same.

6. In a tire carrier, a rigid supporting frame including two sides of circular contour, the external diameter of the same being somewhat less than the internal diameter of the rim to be supported thereby, spacer means carried by the rigid portion of the carrier for engaging the flat inner surface of a tire rim to hold that part of said rim in slightly spaced relation to the outer surface of the carrier, whereby the carrier is adapted to receive and carry tire rims of different styles, a plurality of jaws on the carrier arranged to engage a rim at its opposite edges, said jaws being spaced apart appropriately to prevent removal of the rim from the carrier, two of said jaws being movable toward and from the center of the carrier, and a toggle lever connected therewith for operating the same, and stops on the toggle lever to hold the two parts thereof in substantial alinement, the pivotal center of the toggles being below a line intersecting the pivotal end connections of the toggles when the toggles are straightened out.

7. In a tire rim carrier, a rigid body portion comprising two curved sides approximating the curvature of the rim to be supported thereby but of slightly less diameter than the interior diameter of such a rim, two hinged clamping sections at the lower ends of the sides, spacer means mounted on the carrier to hold a rim in position whereby the flat inner surface thereof is held spaced away from the outer surface of the carrier to afford clearance for annular rib formations on the flat inner surface of said rim, whereby the carrier is adapted to receive and carry tire rims of different styles, a jaw carried by the rigid portion of the carrier for engaging the rim at its opposite edges, a jaw carried adjacent the end of the hinged section for engaging a rim at its opposite edges and on opposite sides, all of said jaws being spaced apart appropriately to hold a tire rim against removal when in place, the distance between the hinge pivots of the hinged sections measured circumferentially around the upper part of the carrier, being less than 180°, the distance between the jaws on the hinged sections, measured circumferentially around the upper part of the carrier, being more than 180°, with means for moving the hinged sections to and fro and for positively holding them in the rim engaging position.

8. In a tire rim carrier, a rigid body portion comprising two curved sides approximating the contour of the rim to be supported thereby but of slightly less diameter than the interior diameter of such a rim, two hinged clamping sections at the lower ends of the sides, spacer means mounted on the carrier to hold a rim in position whereby the flat inner surface thereof is held spaced away from the outer surface of the carrier to afford clearance for annular rib formations on the inner surface of the rim, whereby the carrier is adapted to receive and carry tire rims of different styles, a jaw carried by the rigid portion of the carrier for engaging the rim at its opposite edges, jaws carried adjacent the ends of the hinged sections of the carrier for engaging a rim at its opposite edges, all of said jaws being spaced apart appropriately to hold a tire rim against removal when in place, the distance between the hinge pivots for the hinged sections measured circumferentially around the upper part of the carrier, being less than 180°, the distance between the jaws on the hinged sections, measured circumferentially around the upper part of the carrier, being more than 180°, with means for moving the hinged sections to and fro and for holding them in the rim engaging position, said means comprising a pair of toggle levers.

9. In a tire rim carrier, a rigid body portion comprising two curved sides approximating the curvature of the rim to be supported thereby, but of slightly less diameter than the interior diameter of such a rim, two hinged clamping sections at the lower ends of the sides, spacer means mounted on the carrier to hold a rim in position, whereby the flat inner surface thereof is held spaced away from the outer surface of the carrier to afford clearance for annular rib formations on the inner surface of the rim, whereby the carrier is adapted to receive and carry tire rims of different styles, a jaw carried by the rigid portion of the carrier for engaging the rim at its opposite edges, a jaw carried adjacent the end of each hinge section of the carrier for engaging a rim at opposite edges, said jaws being spaced apart appropriately to hold a tire rim against removal when in place, the distance between the hinge pivots of the hinged sections, measured circumferentially around the upper part of the carrier, being less than 180°, the distance between the jaws on the hinged sections, measured circumferentially around the upper part of the carrier, being more than 180°, with means for moving the hinged sections to and fro and for holding them in the rim engaging position, said means comprising a pair of toggle levers, said toggle levers having stops thereon stopping the same in a straight line when moved into the rim holding position, the pivotal connection between the toggles being below a line intersecting the pivotal connections at the ends of the toggles, whereby the several pivotal connections and said stops will operate to positively hold the toggles in a straightened out position.

HENRY G. VOIGHT.